United States Patent
Zhang et al.

(10) Patent No.: US 7,529,370 B1
(45) Date of Patent: May 5, 2009

(54) DIGITAL MEDIA-PLAYING DEVICE AND A METHOD OF PLAYING DIGITAL MEDIA THEREIN

(75) Inventors: Kan Zhang, Palo Alto, CA (US); James A. Rowson, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 782 days.

(21) Appl. No.: 10/835,891

(22) Filed: Apr. 29, 2004

(51) Int. Cl.
*G06F 21/00* (2006.01)
(52) U.S. Cl. .............................. 380/231; 705/52; 705/77
(58) Field of Classification Search ................. 380/231, 380/233, 234
See application file for complete search history.

(56) References Cited

U.S. PATENT DOCUMENTS

| | | | | |
|---|---|---|---|---|
| 4,751,732 A | * | 6/1988 | Kamitake | 380/230 |
| 5,878,135 A | * | 3/1999 | Blatter et al. | 380/239 |
| 6,282,293 B1 | * | 8/2001 | Itoh et al. | 380/233 |
| 6,507,727 B1 | | 1/2003 | Henrick | |
| 6,748,532 B1 | * | 6/2004 | Digiorgio et al. | 713/159 |
| 7,251,832 B2 | * | 7/2007 | Venters et al. | 726/26 |
| 2002/0138741 A1 | * | 9/2002 | Koch | 713/185 |
| 2004/0076298 A1 | * | 4/2004 | Oliver | 380/231 |
| 2005/0021414 A1 | * | 1/2005 | Liebenow | 705/26 |

\* cited by examiner

*Primary Examiner*—Matthew B Smithers

(57) ABSTRACT

An aspect of the present invention is a digital media-playing device. The digital media-playing device includes a controller and a compensation-enabled component for playing digital media coupled to the controller wherein the compensation-enabled component is non-bypassable.

32 Claims, 9 Drawing Sheets

DIGITAL MEDIA-PLAYING DEVICE AND A METHOD OF PLAYING DIGITAL MEDIA THEREIN

FIELD OF THE INVENTION

The present invention relates generally to the field of delivering digital entertainment media and more particularly to a digital media-playing device and a method of playing digital media therein.

BACKGROUND OF THE INVENTION

The Internet is changing the distribution of music and video content. Recent advances in audio and video compression, higher bandwidth Internet connections, and the decreasing cost of memory have made it practical for users to download audio and video content via the Internet to personal and other dedicated digital devices. The downloaded content can also be transferred to CDs, mini-discs, or digital video discs and played on other audio and video devices such as MP3-format digital players. MP3 (MPEG Audio Layer-3) format is a compression system for digital music that helps reduce the size of a digitized song without degrading the sound quality.

Digital music converted to MP3 format is currently available on the World Wide Web for individual use. MP3 files can be downloaded from the Internet using a computer and special software. Furthermore, a personal computer programmed with the appropriate software can convert digital music from a CD (compact disk) into MP3 format. Currently, MP3 files can be played in three different ways: (i) MP3 files can be played directly on a personal computer, (ii) MP3 files can be decompressed and recorded onto a CD, and (iii) the MP3 files can be played on an MP3 player. MP3 players are relatively small, lightweight, portable devices that can interface with a personal computer. Thus, a user can download MP3 files from the Internet and load such MP3 files onto the MP3 player. Typically, the MP3 player can be connected to the personal computer's parallel or Universal Serial Bus (USB) port in order to receive the downloaded MP3 files.

FIG. 1 is illustration of a conventional system 100 for exchanging digital media. The system 100 includes an MP3 player 110 and a computer system 120. Accordingly, the MP3 player 110 is coupled to the computer system 120 wherein the computer system 120 is coupled to the Internet 130. Typically, a user who wishes to download a particular song or video via the Internet 130 searches for the title at a web site 135, finds the title and requests that it be downloaded. A digital file containing the requested content is then transferred to the computer system 120 using a File Transfer Protocol (FTP) and stored within a memory component in the computer system 120. The digital file can then be transferred from the computer system 120 to the MP3 player 110.

This practice of downloading media from the Internet, particularly music, has been a source of much controversy. Peer-to-peer (P2P) software such as Napster, Morpheus and Kazaa have been utilized to provide consumers with the ability to freely share copyrighted digital media. In a sense, such software makes it possible for consumers to arguably commit intellectual property theft with relative ease. As a result, consumers have little or no motivation to go to a record store and purchase CDs, albums or the like when they can simply download the desired music via the Internet. Needless to say, media providers, as well as the creators of the music, are opposed to such practices since they do not receive any financial compensation when the copyrighted digital media is downloaded and played by the users of the P2P software.

Two major approaches to digital rights management (DRM) have been proposed to address this issue. The first approach is to make the computer systems used for media distribution and playing trustworthy so that more controls can be implemented within the computer systems. This approach is known as the Trusted Computing (TC) approach. Utilizing the TC approach, a trusted platform (or operating system) is implemented on a computer system whereby the provider of the trusted platform (as opposed to the owner of the computer system) is able to monitor and control what happens on the computer system. For example, controls can include restrictions on unauthorized copying of media files. However, there are some drawbacks to this approach.

First, implementing a TC platform can be expensive since every computer system that handles media must include a trusted platform. Second, the implementation of a trusted platform allows the platform provider (not the consumers who own the computer systems) the capability to do things other than manage digital rights. For example, the platform provider can spy on all activities happening on the computer systems which raises major privacy concerns for consumers who own the computer systems. Lastly, this approach to DRM calls for more controls on the flow of media rather than less. Ideally, society benefits most if unrestricted access to media content is made possible by advancements in technology, such as communication via P2P networks.

A second approach to DRM involves consumer taxation. In this approach, consumers are taxed in exchange for the ability to play and share media files. The taxes collected are subsequently used to compensate media content creators/owners. Current proposals call for taxing on income or on devices such as MP3 players. Other proposals call for taxing services that can potentially be used to gain access to media content. For example, Internet Service Providers (ISPs) could be taxed since ISPs could be utilized to transfer digital media. Similarly, a DVD copier could be taxed since the copier could be used to make copies of digital files. However, these types of taxing proposals are inequitable in that the proposal are based on the potential consumption of digital media rather than the actual consumption of digital media.

Accordingly, what is needed is a method and system that addresses the problems related to the use of digital rights management. The method and system should be simple, cost effective and capable of being easily adapted to existing technology. The present invention addresses these needs.

SUMMARY OF THE INVENTION

An aspect of the present invention is a digital media-playing device. The digital media-playing device includes a controller and a compensation-enabled component for playing digital media coupled to the controller wherein the compensation-enabled component is non-bypassable.

Other aspects and advantages of the present invention will become apparent from the following detailed description, taken in conjunction with the accompanying drawings, illustrating by way of example the principles of the invention.

DETAILED DESCRIPTION

Figure 1:
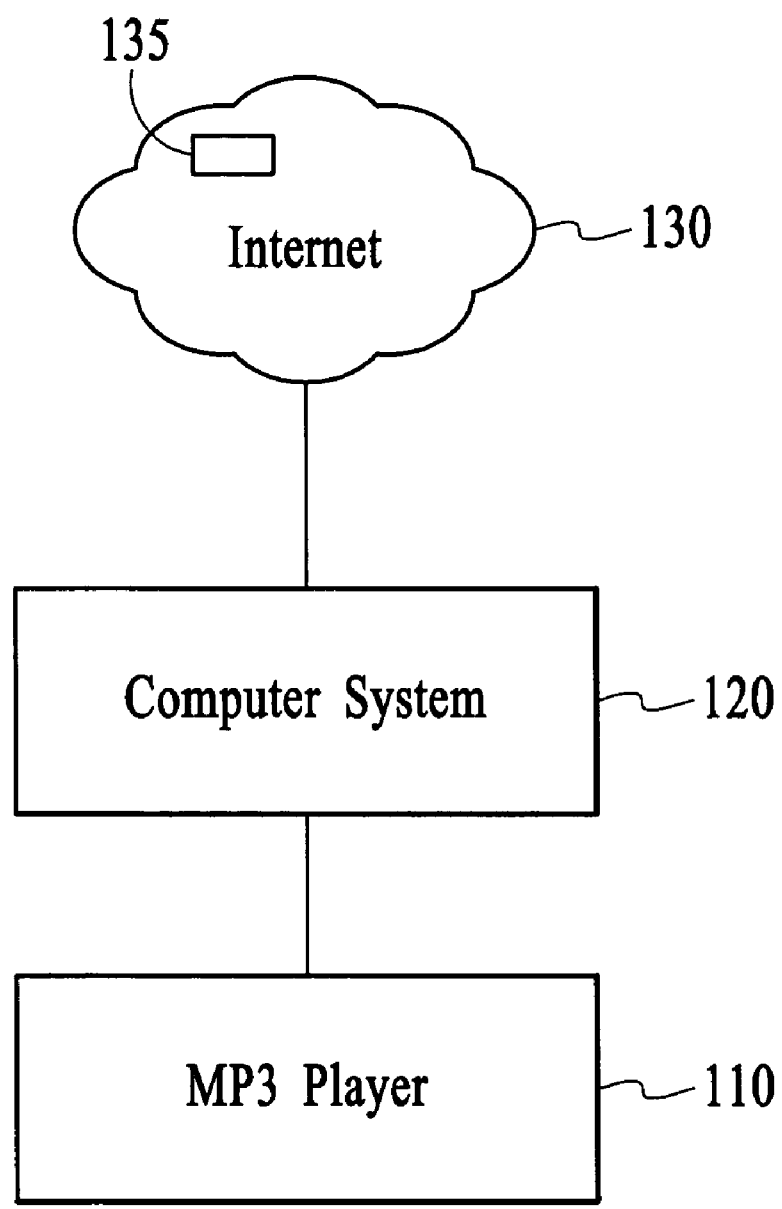
FIG. 1 is illustration of a conventional system for exchanging digital media.

The present invention relates to a digital media-playing device and a method of playing digital media therein. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

As shown in the drawings for purposes of illustration, the present invention encompasses varying embodiments of a digital media-playing device and a method of playing digital media therein. Accordingly, a component is implemented in conjunction with a digital media-playing device wherein the component is compensation-enabled. By implementing such a component, an equitable means for compensating media distributors based on the playing of digital media is established whereby consumers of digital media are charged based on actual consumption rather than potential consumption.

Figure 2:
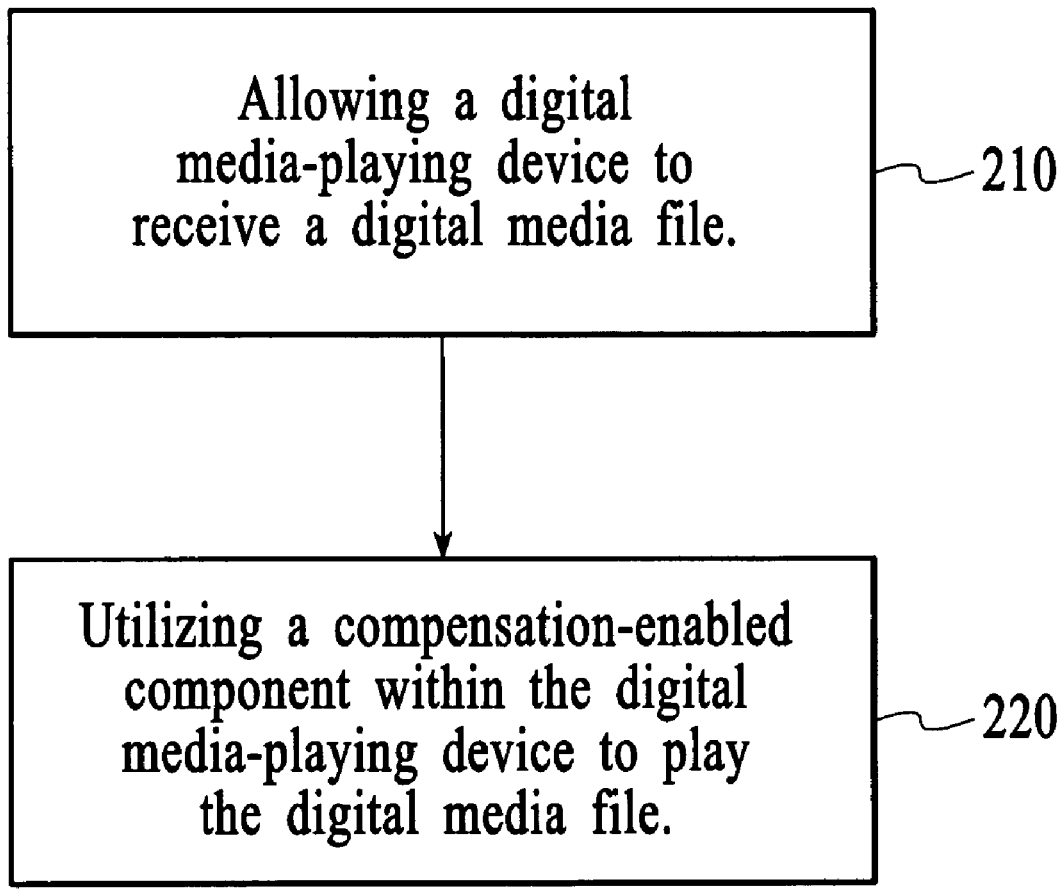
FIG. 2 is a flow chart of a method in accordance with an embodiment of the present invention.

FIG. 2 is a flow chart of a method in accordance with an embodiment of the present invention. A first step 210 includes allowing a digital media-playing device to receive a digital media file. A final step 220 includes utilizing a compensation-enabled component within the digital media-playing device to play the digital media file. In an embodiment, the digital media-playing device is an MP3 player and the compensation-enabled component is a removable hardware component.

Figure 3:
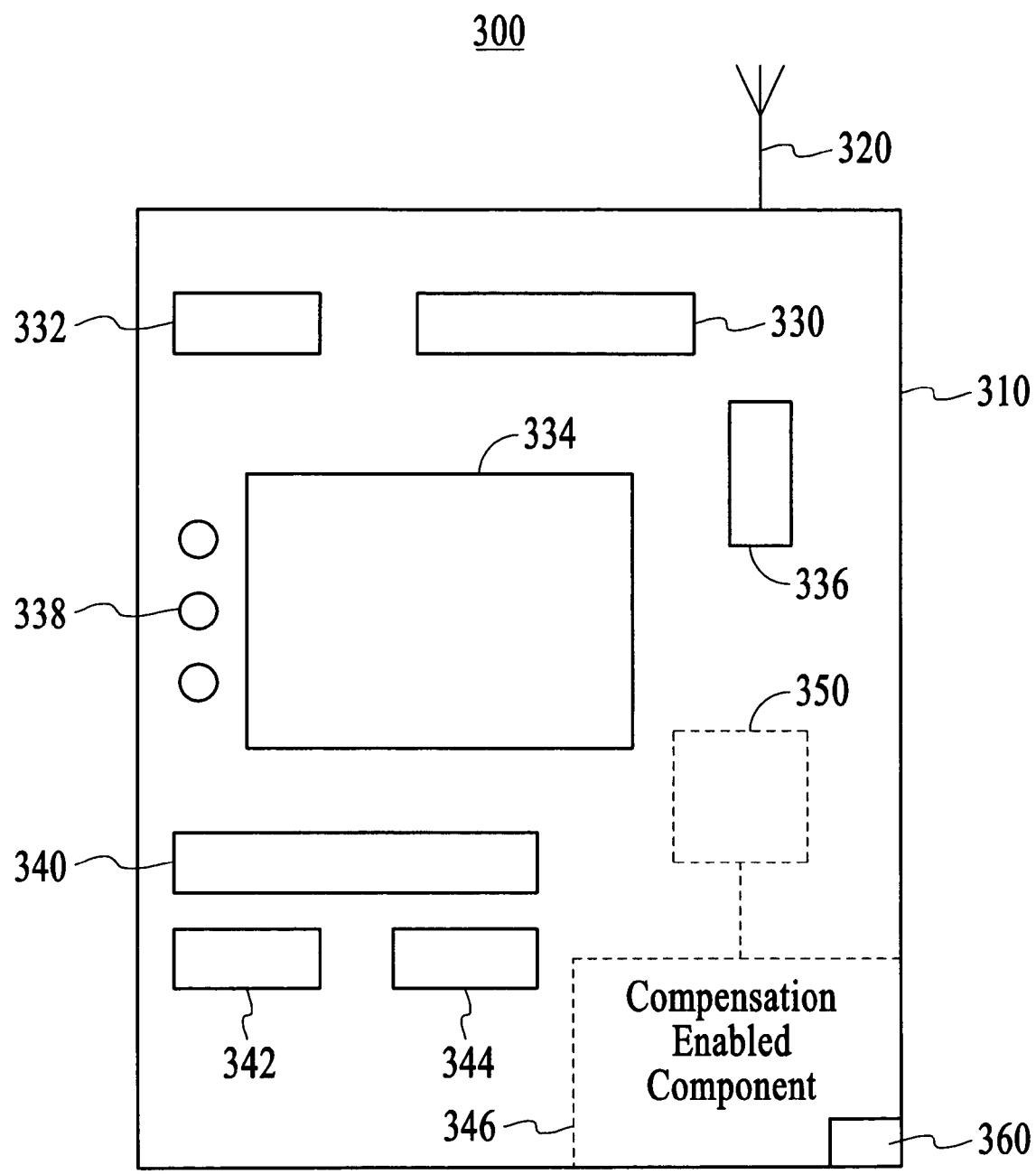
FIG. 3 is a block diagram of an MP3 player that could be utilized in conjunction with an embodiment of the present invention.

As described above, the method is implemented in conjunction with a media-playing device such as an MP3 player. FIG. 3 is a block diagram of an MP3 player 300 that could be utilized in conjunction with an embodiment. The player 300 generally includes a housing 310, an antenna 320, a first display 330, connect/disconnect function key 332, a second display 334, browse/select wheel or knob 336, function keys 338, keypad 340, "play" function key 342, "stop" function key 344. The MP3 player 300 also includes an internal compensation-enabled component 346 and a controller 350 coupled to the compensation-enabled component 346.

Connect/disconnect function key 332 allows the user to establish or terminate data communication with a network. The user can use keypad 340 to input data which appears in display 330. Display 334 displays information relating to titles or names of songs, musical compositions, types of music, e.g. jazz, classical, etc. The user employs the browse/select wheel or knob 336 to select one or more titles shown in display 334. Function keys 338 provide several functions such as volume, bass, treble, DNR (Dolby™ Noise Reduction), etc. The user depresses function keys 342 and 344 to start and stop respectively, the play of music. Player 300 includes audio output devices (not shown) such as a speaker or headphone connector.

Although an MP3 player is utilized in conjunction with the above-described embodiment, one of ordinary skill in the art will readily recognize that a variety of digital-media playing devices such as a personal digital assistant (PDA) or a personal computer system could be employed while remaining within the spirit and scope of the present invention.

As previously mentioned, the controller 350 is coupled to the compensation-enabled component 346. In an embodiment, the compensation-enabled component 346 is a non-bypassable hardware component that includes a control module 360 for controlling the playing of media with the player 300. What is meant by the term "non-bypassable" is that whenever a media file is played, cooperation from this component is needed. An example of a non-bypassable component for playing digital media is a media decoder (MPEG decoder, MP3 decoder) chip. A media decoder chip decodes the media file so that the file can be played by the media player 300. However one of ordinary skill in the art will readily recognize that a variety of components other than a media decoder could be utilized.

The term "compensation enabled" relates to the employment of the control module 360. In an embodiment, the control module 360 is configured to keep track of the media usage statistics of the component 346. These usage statistics can subsequently be used to determine an appropriate compensation for associated media providers. To facilitate this concept, the compensation-enabled component 346 can be a physically replaceable component as will be explained herein below.

Figure 4:
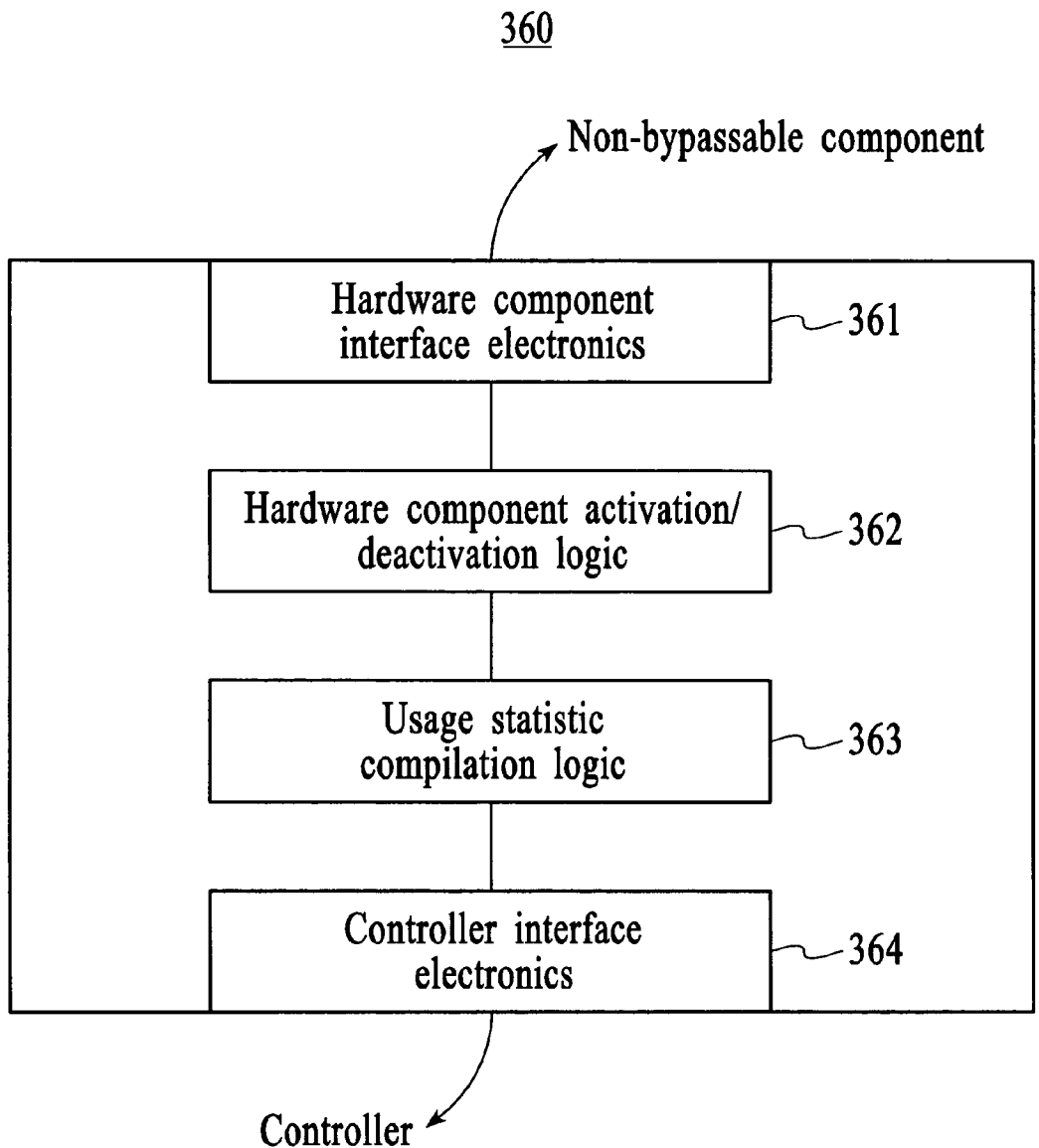
FIG. 4 shows a more detailed illustration of the control module in accordance with an embodiment of the present invention.

FIG. 4 shows a more detailed illustration of the control module 360 in accordance with an embodiment of the present invention. The control module 360 includes hardware component interface electronics 361, hardware component activation/deactivation logic 362, usage statistic compilation logic 363 and controller interface electronics 364. The hardware component interface electronics 361 are coupled hardware component activation/deactivation logic 362 wherein the hardware component activation/deactivation logic 362 is further coupled to the usage statistic compilation logic 363. The usage statistic compilation logic 363 is further is coupled to the controller interface electronics 364.

Although the components of the above-described control module 360 are shown in a specific configuration, one of ordinary skill in the art will readily recognize the components of the control module 360 could be configured in a variety of ways while remaining within the spirit and scope of the present invention.

The hardware component interface electronics 361 and the controller interface electronics 364 include the electronic circuitry employed by the control module 360 to respectively communicate with the component 346 and the controller 350. Activation/deactivation logic 362 contains logic for activating and deactivating the component 346.

The usage statistic compilation logic 363 includes logic for maintaining statistics related to the operation of the media-playing device 300. These statistics include information regarding the type of media files that are played the media-playing device 300, how many times a particular file was played, etc. Additionally, the activation/deactivation logic 362 also includes a counter that counts the number of times the component 346 is activated to play a media. Accordingly, once a predetermined number of media files have been played, the component 346 is deactivated with the activation/deactivation logic 362. Additionally, the counter can be configured to account for files that have only been played partially whereby the configuration is determined by the media content provider.

For example, each control module 360 can be loaded with a number of media playing units, for example, digital tokens, wherein the number of digital tokens is based on a predetermined usage limit. The number of digital tokens are represented by the counter in the activation/deactivation logic 362. Accordingly, each time a new digital media file is played with the media-playing device 300, the number of digital tokens remaining in the module 360 is reduced by a predetermined amount. This action can be facilitated since the component 346 is non-bypassable with regard to the playing of digital media. It should be noted that any number of digital files can be loaded into the memory of the digital media playing device, however the number of tokens are reduced only when the files are actually played.

Once the number of digital tokens reaches zero, the component 346 is deactivated with the activation/deactivation logic 362 and digital media files can no longer be played with the media-playing device 300. However, as previously mentioned, the compensation-enabled component 346 is physically replaceable. Consequently, once the compensation-enabled component 346 is disabled, a user can replace the disabled component 346 with a new component. This is analogous to replacing a dead battery with a new battery.

In order to compensate media content providers, the price for a new compensation-enabled component includes a media consumption fee which is to be distributed amongst the media content providers. Component vendors can offer some incentives (e.g. a 10% discount on the purchase of a new component with the return of a used component) to get the used components from the users so that media consumption data (e.g. which files were played, how many times each file was played) can be obtained from the used components. Using this data, an estimate on the amount of media consumption can be made. Based on this estimate, a more equitable compensation scheme can be implemented based on actual media consumption as opposed to potential media consumption. For example, if a particular song is more popular than any other song, the provider of that particular song is compensated more generously than the other providers. Additionally, the component should be tamper-resistant in order to prevent access to the control module and ensure that the statistics retrieved from the used hardware components are accurate.

Figure 5:
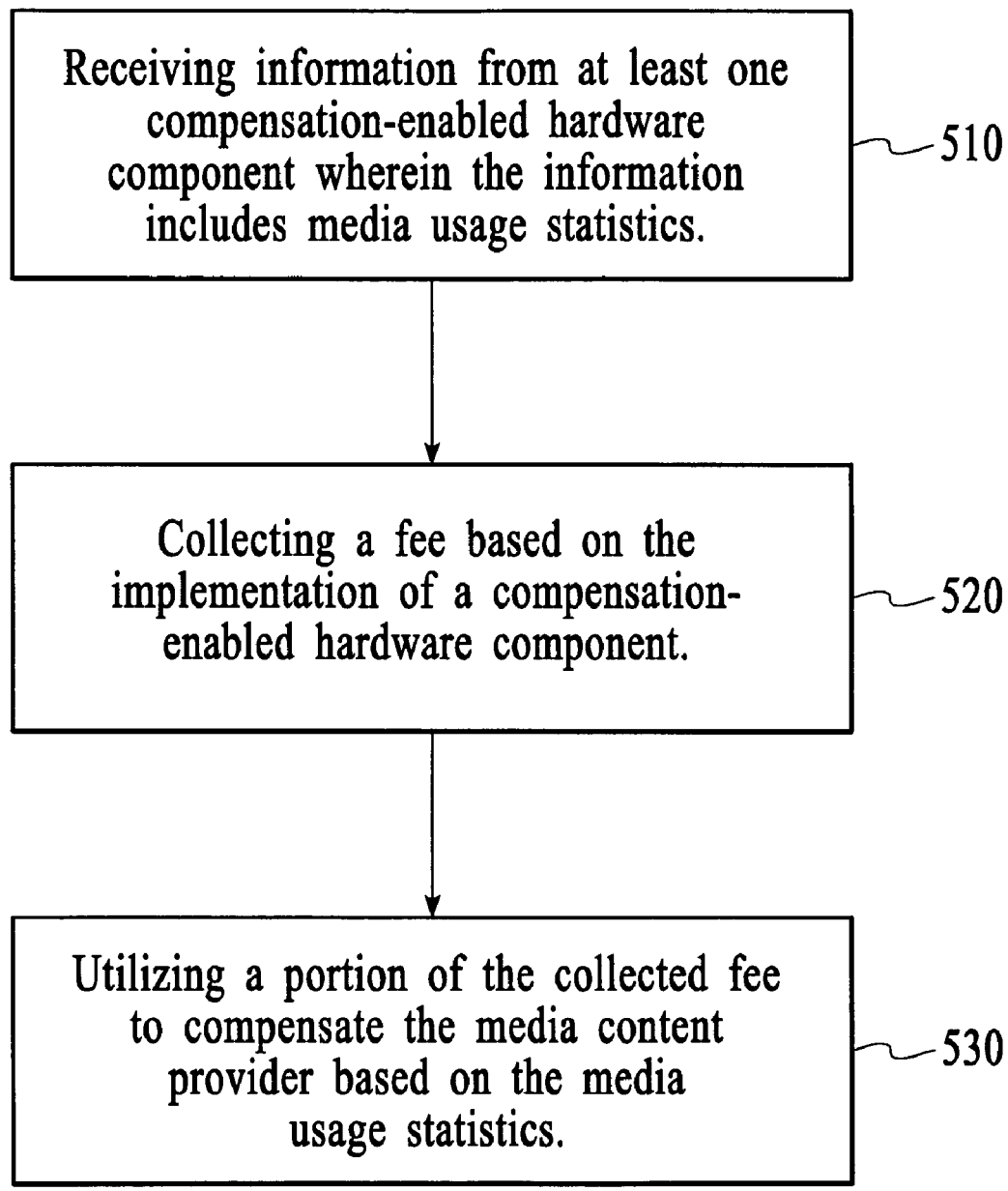
FIG. 5 is a flowchart of a method of compensating media providers in accordance with an embodiment of the present invention.

Accordingly, a method of doing business based on the above-delineated concepts is proposed. FIG. 5 is a flowchart of a method of compensating media providers in accordance with an embodiment. A first step 510 includes receiving information from at least one compensation-enabled component wherein the information includes media usage statistics. In an embodiment, the at least one compensation-enabled component is a used decoder and the media usage statistics are compiled in the embedded control module. A second step 520 includes collecting a fee based on the implementation of a compensation-enabled component. In an embodiment, the collected fee is based on the sale of a new decoder. In an alternate embodiment (as will be explained below), the fee is collected via the Internet based on a re-setting of the counter embedded in the control module. A final step 530 includes utilizing a portion of the collected fee to compensate a media content provider based on the media usage statistics.

As compared with the TC platform approach, the above-described concepts have the following advantages. First, these concepts are cheaper to implement since only a single component (the non-bypassable component) needs to be trusted as opposed to the entire operating system as is the case with the TC approach. Second, there are less privacy concerns with these concepts than with the TC approach since the data collected from the compensation-enabled component only relates to the media played with the component and there is no link from a used component to the identity of a user. Finally, the above-described concepts promote the free flow of media files since there is no need to restrict the copying and sharing of media files because media content providers are compensated based on the playing of the media files.

In an alternate embodiment, the control module can be utilized in conjunction with a removable smart card. Generally speaking, smart cards are wallet-sized (or smaller) cards incorporating a microprocessor or micro-controller to store and manage data within the card. More complex than magnetic stripe and stored-value cards, smart cards are characterized by sophisticated memory management and security features. Multi-function cards, for example, are often configured to support credit, debit, stored value and a number of other applications all within a single card. A typical multi-function smart card includes a micro-controller embedded within the card plastic which is electrically connected to an array of external contacts provided on the card exterior.

The smart card micro-controller generally includes an electrically-eraseable and programmable read only memory (EEPROM) for storing user data, random access memory (RAM) for scratch storage and read only memory (ROM) for storing the card operating system. Relatively simple micro-controllers are adequate to control these functions. Thus, it is not unusual for smart cards to utilize 8-bit, 5 MHZ micro-controllers with about 8K of EEPROM memory (for example, the Motorola 6805 or Intel 8051 micro-controllers).

A number of standards have been developed to address various aspects of smart card, e.g. ISO 7816, Part 1: Physical characteristics (1987); ISO 7816-2, Part 2: Dimensions and location of the contacts (1988); ISO 7816-3, Part 3: Electronic signals and transmission protocols (1989, Amd.1 1992, Amd.2 1994); ISO 7816-4, Part 4: Inter-industry commands for interchange (1995); ISO 7816-5, Part 5: Numbering system and registration procedure for application identifiers (1994, Amd. 1 1995); ISO/IEC DIS 7816-6, Inter-industry data elements (1995); and ISO/IEC WD 7816-8, Part 8: Inter-industry security architecture (1995). These standards are hereby incorporated by reference.

Figure 6:
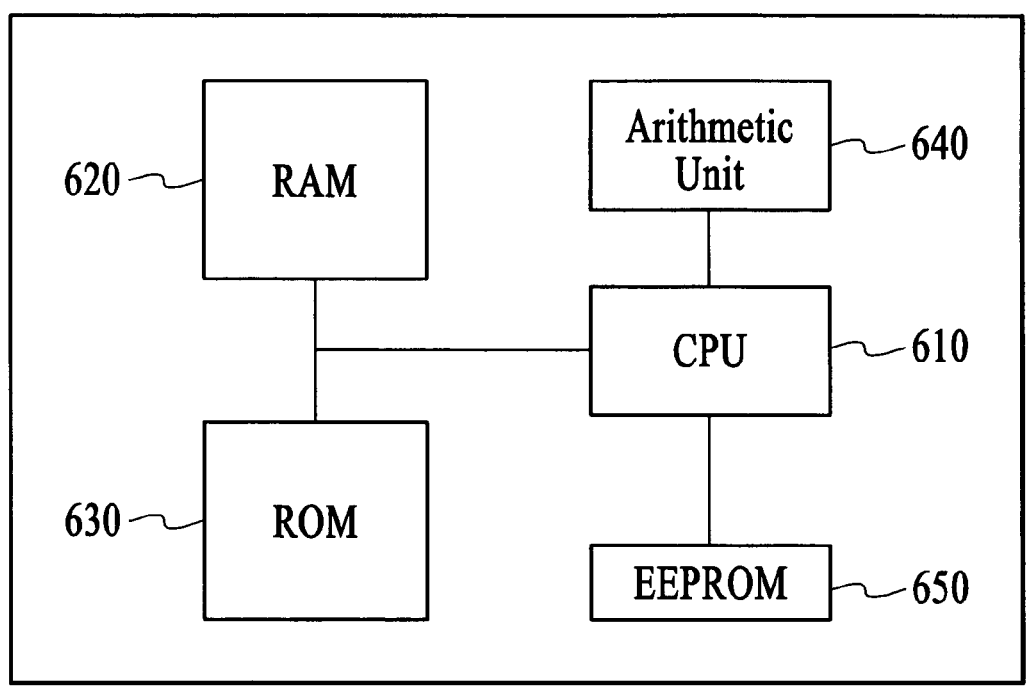
FIG. 6 illustrates a smart card that could be utilized in conjunction with an embodiment of the present invention.

FIG. 6 illustrates a smart card 600 that could be utilized in conjunction with an embodiment. The smart card includes a CPU 610, which is connected to a read only memory (ROM) 630, primarily used for storage of an operating system. A random access memory (RAM) 620 is also provided for volatile storage of data, particularly for program execution. The CPU 610 is connected to an arithmetic logic unit 640, for example one suitable for performing various arithmetic functions such as multiplication and the like. An EEPROM 650 is provided, which typically stores system files and applications. In an embodiment, the EEPROM 650 is configured to operate in conjunction with the control module 360 of the media-playing device 300 (See FIG. 3) whereby digital tokens are stored within the EEPROM 650. Accordingly, each time a new digital media file is played with an associated media-playing device, the number of digital tokens remaining in the EEPROM is reduced by a predetermined amount. Consequently, once the number of digital tokens is reduced to zero, the smart card 600 can no longer be utilized to operate the associated media-playing device.

Figure 7:
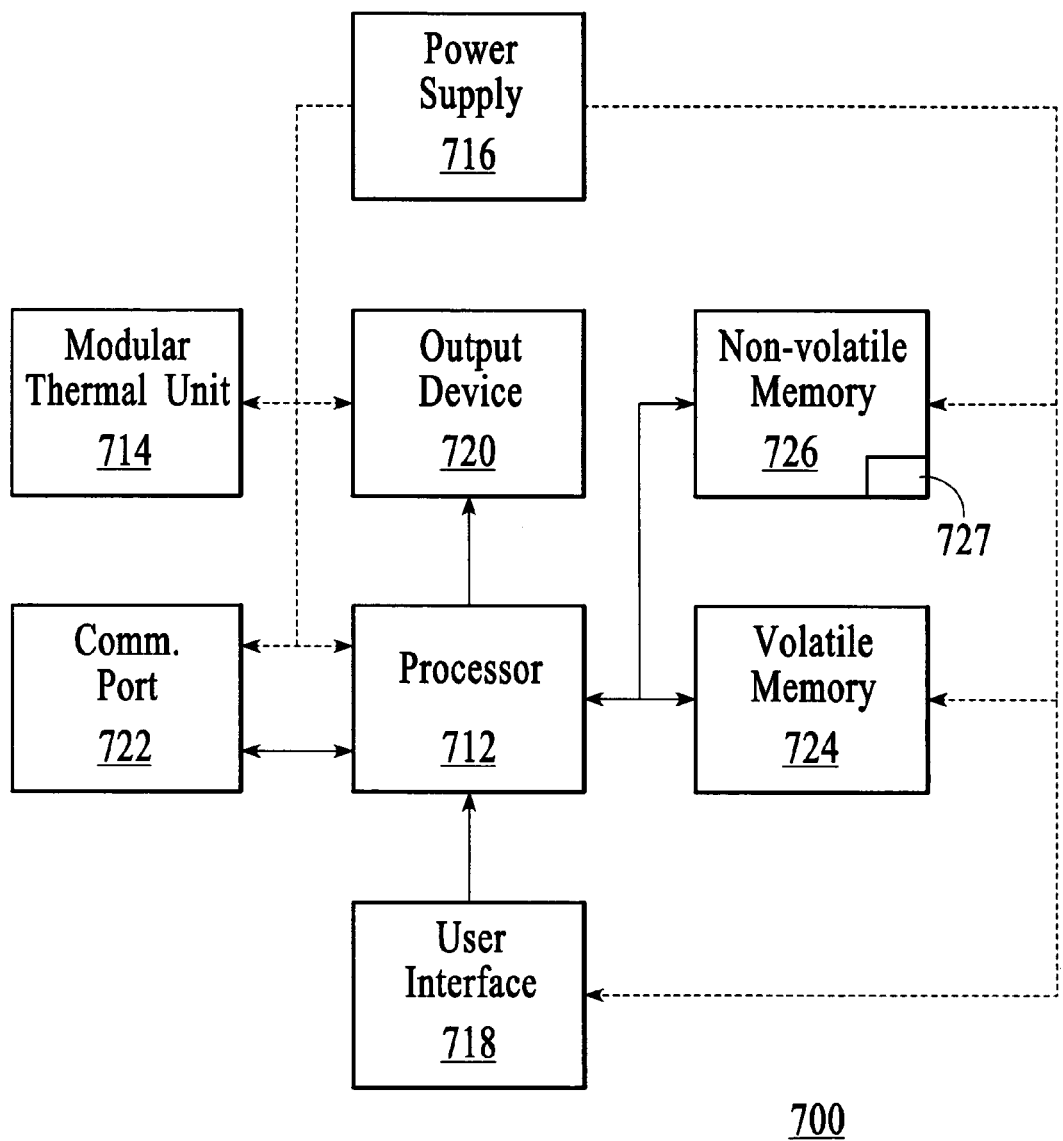
FIG. 7 is a block diagram of a computer system that could by utilized in conjunction with the present invention.

In an alternate embodiment, a control module may be implemented as one or more respective software modules operating on a computer system. For an example of such a computer system, please refer to FIG. 7. In FIG. 7, a block diagram of a computer system, generally designated by the reference numeral 700, is featured. Computer 700 may be any of a variety of different types, such as a notebook computer, a desktop computer, a personal computer, etc. In the illustrated embodiment, a processor 712 controls the functions of computer system 700. In this embodiment, data, as illustrated by the solid line, is transferred between the processor 712 and the components of system 700. Additionally, a modular thermal unit 714 is used to remove heat from the processor 712. Computer 700 also includes a power supply 716 to supply electrical power, as illustrated by the dashed line, to the components of computer system 700. Additionally, power supply 716 may include a battery.

Computer system 700 may incorporate various other components depending upon the desired functions of computer 700. In the illustrated embodiment, a user interface 718 is coupled to processor 712. Examples of a user interface 718 include a keyboard, a mouse, and/or a voice recognition system. Additionally, an output device 720 is coupled to processor 712 to provide a user with visual information. Examples of an output device 720 include a computer monitor, a television screen, a printer or the like. In this embodiment a communications port 722 is coupled to processor 712 to enable the computer system 700 to communicate with an external device or system, such as a printer, another computer, or a network.

Processor 712 utilizes software programs to control the operation of computer 700. Electronic memory is coupled to processor 712 to store and facilitate execution of the programs. In the illustrated embodiment, processor 712 is coupled to a volatile memory 724 and a non-volatile memory 726. A variety of memory types, such as DRAMs, SDRAMs, SRAMs, etc., may be utilized as volatile memory 724. Non-volatile memory 726 may include a hard drive, an optical storage, or another type of disk or tape drive memory. Non-volatile memory 726 may also include a read only memory (ROM), such as an EPROM, to be used in conjunction with volatile memory 724.

The system 700 may also be utilized in conjunction with a distributed computing environment where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol, which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways translate messages from one vendor's messaging program to another vendor's messaging program so that users with different e-mail programs can share messages over a network.

With regard to this embodiment, the software control module is non-bypassable with respect to the playing of digital media whereby the software control module 727 is implemented within the non-volatile memory 726 of the computer system 700. Here, the control module 727 is configured to allow the computer 700 to play a predetermined number of media files based on an embedded counter. Once the predetermined number of media files have been played (i.e. the counter reaches zero), the control module 727 disables the media playing capabilities of the computer 700 and no subsequent media files can be played. At this point, the system user utilizes an authenticated and secure communication channel to access a vendor via the Internet. The vendor can then access the control module 727, (after a payment of a fee by the system user) re-set the counter and upload media consumption data from the module 727.

Figure 8:
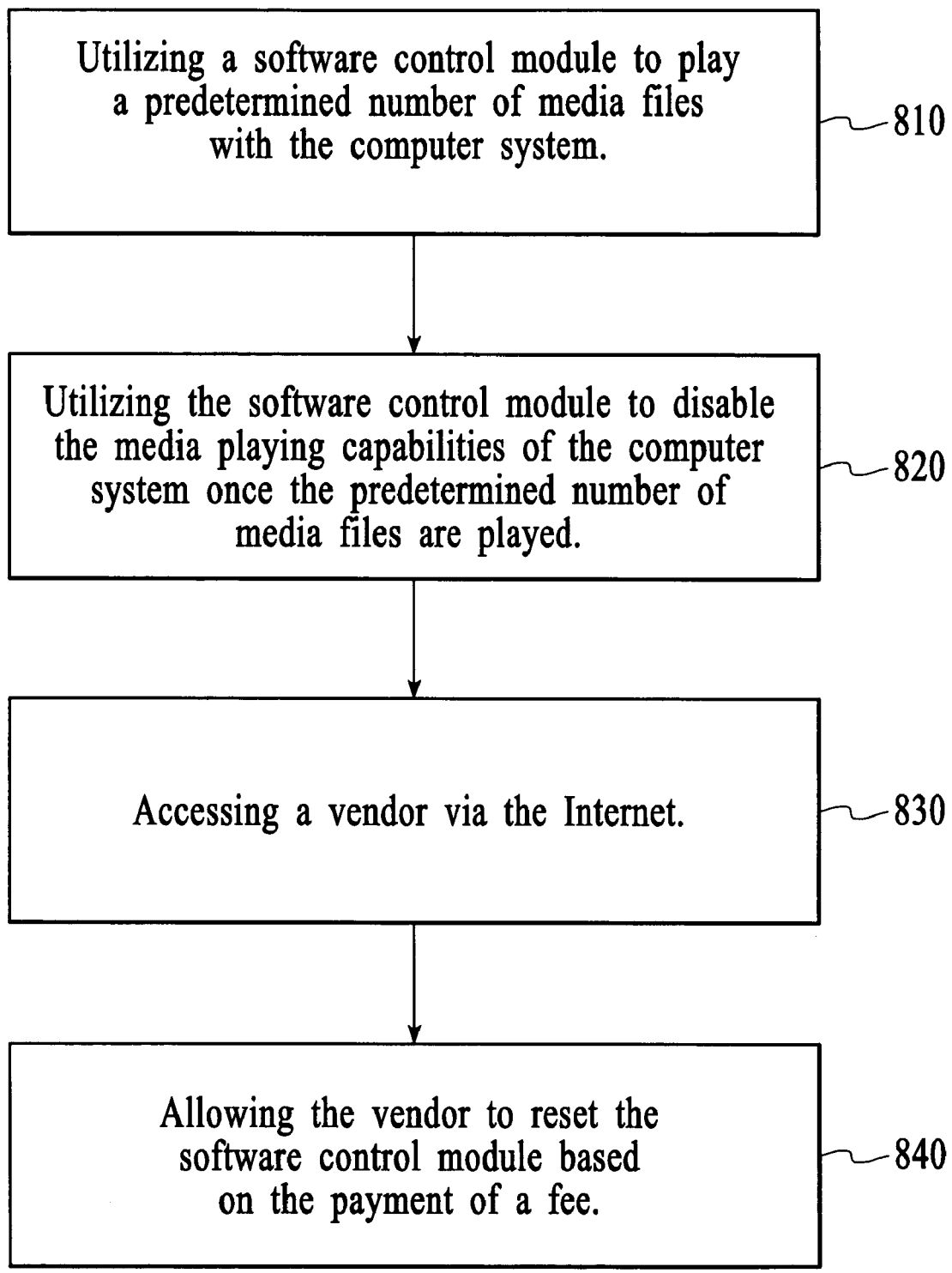
FIG. 8 is a flowchart of a method in accordance with an alternate embodiment of the present invention.

FIG. 8 is a flowchart of method in accordance with the above-disclosed alternate embodiment. A first step 810 includes utilizing a software control module to play a predetermined number of media files with the computer system. Here, the predetermined number of media files are based on an embedded counter within the software control module. A second step 820 includes utilizing the software control module to disable the media playing capabilities of the computer system once the predetermined number of media files are played. A third step 830 includes accessing a vendor via the Internet. A final step 840 includes allowing the vendor to reset the software control module based on the payment of a fee.

The above-described concepts of the invention may also be implemented, for example, by operating a computer system to execute a sequence of machine-readable instructions. The instructions may reside in various types of computer readable media. In this respect, another aspect of the present invention concerns a programmed product, including computer readable media tangibly embodying a program of machine-readable instructions executable by a digital data processor to perform the method in accordance with an embodiment of the present invention.

This computer readable media may include, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape). In an illustrative embodiment of the invention, the machine-readable instructions may include lines of compiled C, C++, or similar language code commonly used by those skilled in the programming for this type of application arts.

Figure 9:
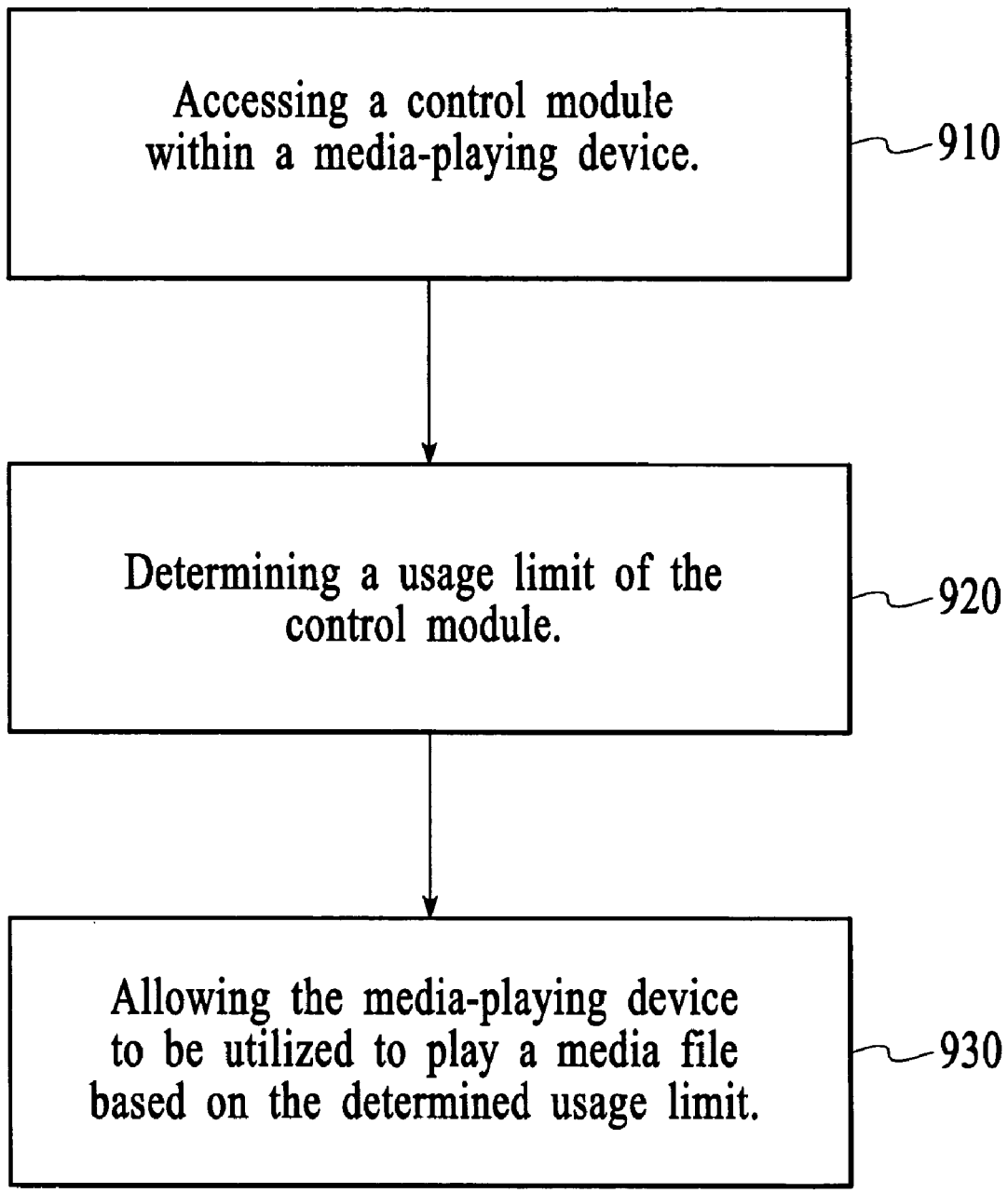
FIG. 9 is a flowchart of program instructions that could be contained within a computer readable medium in accordance with the alternate embodiment of the present invention.

FIG. 9 is a flowchart of program instructions that could be contained within a computer readable medium in accordance with the alternate embodiment of the present invention. A first step 910 involves accessing a control module within a media-playing device. In an embodiment, the media-playing device is a computer system. A second step 920 includes determining a usage limit of the control module. A final step 930 includes allowing the media-playing device to be utilized to play a media file based on the determined usage limit. Accordingly, if the usage limit is determined to be at a predetermined threshold, the media-playing device is prevented from being utilized to play a media file.

The present invention encompasses varying embodiments of a digital media-playing device and a method of playing digital media therein. Accordingly, a component is implemented in conjunction with a digital media-playing device wherein the component is compensation-enabled. By implementing such a component, an equitable means for compensating media distributors based on the playing of digital media is established whereby consumers of digital media are charged based on actual consumption rather than potential consumption.

Without further analysis, the foregoing so fully reveals the gist of the present invention that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

What is claimed:

1. A digital media-playing device comprising:
   a controller operably configured to code/decode MPEG data; and
   a removable compensation-enabled component for playing digital media coupled to the controller wherein the compensation-enabled component is non-bypassable and operable to maintain media usage statistics associated with usage of first and second media content associated with first and second media content providers, respectively, to enable allocation of fees associated with the usage of the first and second media content to the first and second media content providers, respectively.

2. The digital media-playing device of claim 1 wherein the digital media-playing device is a computer system.

3. The digital media-playing device of claim 2 wherein the compensation-enabled component is a software control module.

4. The digital media-playing device of claim 3 wherein the software control module is remotely accessible via the Internet.

5. The digital media-playing device of claim 1 wherein the compensation-enabled component is a media decoder.

6. The digital media-playing device of claim 1 wherein the compensation-enabled component is physically replaceable.

7. The digital media-playing device of claim 6 wherein the compensation-enabled component is tamper-resistant.

8. The digital media-playing device of claim 1 wherein the compensation-enabled component includes a control module.

9. The digital media-playing device of claim 8 wherein the control module is capable of being utilized in conjunction with a smart card.

10. A digital media-playing device comprising:
    a controller operably configured to code/decode MPEG data; and
    a removable compensation-enabled component for playing digital media coupled to the controller wherein the compensation-enabled component is non-bypassable wherein the digital media-playing device is an MP3 player.

11. The digital media-playing device of claim 10 wherein the compensation-enabled component comprises an MP3 decoder.

12. A digital media-playing device comprising:
    a controller operably configured to code/decode MPEG data; and
    a removable compensation-enabled component for playing digital media coupled to the controller wherein the compensation-enabled component is non-bypassable and includes a control module,
    wherein the control module includes:
        usage statistic compilation logic for maintaining statistics related to the operation of the media-playing device; and
        activation/deactivation logic for activating and deactivating the compensation-enabled component based on the statistics.

13. A method of playing a digital media file with a digital media-playing device comprising:
    allowing the digital media-playing device to receive first and second digital media files associated with first and second media content providers, respectively, the first and second digital media files comprising MPEG data;
    utilizing a removable compensation-enabled component within the digital media-playing device to play the first and second digital media files wherein the compensation-enabled component is non-bypassable;
    maintaining media usage statistics associated with usage of the first and second digital media files at the compensation-enabled component to enable allocation of fees associated with usage of the first and second digital media files to the first and second media content providers, respectively.

14. The method of claim 13 wherein the digital media-playing device is a computer system and allowing the digital media-playing device to receive a digital media file further comprises:
    allowing the computer system to receive the digital media file.

15. The method of claim 13 wherein the compensation-enabled component is a media decoder and utilizing a compensation-enabled component within the digital media-playing device to play the digital media file further comprises:
    utilizing the media decoder within the digital media-playing device to play the digital media.

16. The method of claim 15 wherein the media decoder includes a control module.

17. The method of claim 16 wherein utilizing a compensation-enabled component within the digital media-playing device to play the digital media file further comprises:
    utilizing the control module to activate and deactivate the media decoder.

18. The method of claim 17 wherein utilizing the control module to activate and deactivate the media decoder further comprises:
    utilizing a smart card in conjunction with the control module to activate and deactivate the media decoder.

19. A method of playing a digital media file with a digital media-playing device comprising:
    allowing the digital media-playing device to receive a digital media file the digital media file comprising MPEG data; and
    utilizing a removable compensation-enabled component within the digital media-playing device to play the digital media file wherein the compensation-enabled component is non-bypassable, wherein the digital media-playing device is an MP3 player and allowing the digital media-playing device to receive a digital media file further comprises:
allowing the MP3 player to receive the digital media file.

20. A method of playing a digital media file with a digital media-playing device comprising:
allowing the digital media-playing device to receive a digital media file the digital media file comprising MPEG data; and
utilizing a removable compensation-enabled component within the digital media-playing device to play the digital media file wherein the compensation-enabled component is non-bypassable and includes a control module, wherein the control module includes:
usage statistic compilation logic for maintaining statistics related to the operation of the media-playing device; and
activation/deactivation logic for activating and deactivating the media decoder based on the statistics.

21. A method of compensating a media content provider comprising:
receiving information from at least one compensation-enabled component wherein the information includes media usage statistics wherein the media usage statistics correlate to the usage of MPEG data;
collecting a fee based on the implementation of a compensation-enabled component; and
utilizing a portion of the collected fee to compensate the media content provider based on the media usage statistics.

22. The method of claim 21 wherein the at least one compensation-enabled component is a physically replaceable media decoder.

23. The method of claim 22 wherein the physically replaceable media decoder includes a control module.

24. The method of claim 23 wherein implementing a compensation-enabled component further comprises re-setting a counter within the control module.

25. The method of claim 23 wherein the control module includes media usage data and is capable of being utilized in conjunction with a smart card wherein the smart card is capable of collecting the media usage data from the control module.

26. The method of claim 23 wherein the control module includes:
usage statistic compilation logic for maintaining statistics related to the operation of an associated media-playing device.

27. The method of claim 21 wherein the at least one compensation-enabled component is an embedded software control module.

28. The method of claim 27 wherein receiving information from at least one compensation-enabled component further comprises:
remotely accessing the embedded software control module via the Internet.

29. The method of claim 28 wherein the fee is collected via the Internet.

30. A computer program product for playing a digital media file with a digital media-playing device, the computer program product comprising a computer readable media having computer readable program means for causing a computer to perform the steps of:
accessing a control module within the digital media-playing device;
determining a usage limit of the control module; and
allowing the digital media-playing device to be utilized to play a media file based on the determined usage limit wherein the media file further comprises MPEG data.

31. The computer program product of claim 30 wherein the digital media-playing device comprises an MP3 player and allowing the digital media-playing device to be utilized to play a media file based on the determined usage limit further comprises:
allowing the MP3 player to be utilized to play a media file based on the determined usage limit.

32. A control module for a digital-media playing device comprising:
usage statistic compilation logic for maintaining statistics related to the operation of the digital media-playing device, the digital media-playing device operably configured to code/decode MPEG data; and
activation/deactivation logic for activating and deactivating an associated non-bypassable component within the digital media-playing device based on the statistics.

* * * * *